US007653712B1

(12) United States Patent
Dubrovsky et al.

(10) Patent No.: US 7,653,712 B1
(45) Date of Patent: Jan. 26, 2010

(54) METHODS AND APPARATUS FOR PROCESSING CONFIGURATION DATA

(75) Inventors: Alexander Dubrovsky, Westborough, MA (US); Xiaojun Wu, Grafton, MA (US); Yifeng Chen, Milford, MA (US); Yong Cai, Westborough, MA (US); James E. Lavallee, Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 819 days.

(21) Appl. No.: 11/094,817

(22) Filed: Mar. 30, 2005

Related U.S. Application Data

(63) Continuation-in-part of application No. 10/954,992, filed on Sep. 30, 2004.

(51) Int. Cl.
 *G06F 15/173* (2006.01)
 *G06F 11/00* (2006.01)
(52) U.S. Cl. .................... 709/223; 709/224; 714/52; 714/746; 714/798; 714/799; 714/800
(58) Field of Classification Search ................ None
 See application file for complete search history.

(56) References Cited

U.S. PATENT DOCUMENTS

| 4,849,978 | A | * | 7/1989 | Dishon et al. | ............... | 714/6 |
| 5,539,879 | A | * | 7/1996 | Pearce et al. | ............... | 714/47 |
| 5,919,247 | A | * | 7/1999 | Van Hoff et al. | ............ | 709/217 |
| 6,049,612 | A | * | 4/2000 | Fielder et al. | ............... | 380/44 |
| 6,330,600 | B1 | * | 12/2001 | Matchefts et al. | ............ | 709/223 |
| 6,738,970 | B1 | * | 5/2004 | Kruger et al. | ............... | 717/175 |
| 6,748,381 | B1 | * | 6/2004 | Chao et al. | .................... | 707/10 |
| 7,096,415 | B1 | * | 8/2006 | Bots | ............................ | 714/807 |
| 7,213,039 | B2 | * | 5/2007 | Ramanujam | ............... | 707/203 |
| 2003/0023718 | A1 | * | 1/2003 | Smith, II | .................... | 709/224 |
| 2005/0177466 | A1 | * | 8/2005 | Willins | ........................ | 705/28 |
| 2005/0268341 | A1 | * | 12/2005 | Ross | ............................ | 726/26 |

OTHER PUBLICATIONS

IEEE 100 The Authoritative Dictionary of IEEE Standards Terms, Dec. 2000, IEEE, Seventh Edition, p. 165.*
Wolter, Jan, A Guide to Web Authentication Alternatives, Oct. 2003, pp. 1-6, retrived from http://unixpapa.com/auth/basic.html.*

(Continued)

*Primary Examiner*—John Follansbee
*Assistant Examiner*—Matthew S Lindsey
(74) *Attorney, Agent, or Firm*—Chapin IP Law, LLC

(57) ABSTRACT

An agent of a storage area network generates a first checksum value for a first set of zone configuration data used to at least initially configure the storage area network. At a later time, after a potential change to the first zone configuration data of the storage area network, the agent generates a checksum value based on current zone configuration data presently used to configure the zone in the storage area network. The agent then compares the first checksum value and the second checksum value to identify whether there has been a change to the first zone configuration data. That is, if the first checksum value does not equal the second checksum value, the agent flags that there has been a change to zone configuration data of the storage area network. Users can control behavior of zoning importation and activation depending on whether current zone configuration data has been changed.

22 Claims, 10 Drawing Sheets

OTHER PUBLICATIONS

Vacca, John, Flexible SAN Management through Zoning, Feb. 13, 2003, pp. 1-3, retrieved from http://www.enterprisestorageforum.com/sans/features/article.php/11188_1583811_3.*

Mohamed, Fuad; Cyclic Codes for Error Detection W.W. Peterson and D.T. Brown; retrived from: http://www.cs.nmsu.edu/~pfeiffer/classes/573/sem/s05/presentations/Paper14.pdf.*

* cited by examiner

METHODS AND APPARATUS FOR PROCESSING CONFIGURATION DATA

RELATED APPLICATION

This application is a Continuation-In-Part (CIP) of earlier filed U.S. patent application Ser. No. 10/954,992 entitled "METHODS AND APPARATUS FOR SYNCHRONIZING CONFIGURATION DATA," filed on Sep. 30, 2004, the entire teachings of which are incorporated herein by this reference.

BACKGROUND

The rapid expansion of information service and data processing industries has resulted in a need for computer systems to manage and store large amounts of data. As an example, financial service companies such as banks, mutual fund companies or the like often operate complex data processing systems that require access to many hundreds of gigabytes or even terabytes of data stored in high capacity data storage systems.

Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems (e.g., many host computers) that operate as servers to access data stored in the data storage systems (e.g., via a complex switched-network) on behalf of client computers that request data from the servers. Typically, storage area networks support hi-speed acquisitions of data so that the host servers are able to promptly retrieve data from the data storage system.

Conventional storage area network management applications typically include corresponding conventional graphical user interfaces (GUIs) that enable network managers to graphically manage, control and configure various types of hardware and software resources associated with a corresponding managed storage area network. For example, one conventional network management storage application generates a graphical user interface utilized by a network manager to graphically select, interact with, and manage local or remote devices and software processes associated with the storage area network.

More specifically, based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. In some storage area networks, a conventional network management station and associated management software allows a network administrator or systems manager (a person responsible for managing the storage network) to establish "zones" of related resources within the storage network.

Generally, a zone of resources in a storage network is an association, relation or grouping of resources (e.g., servers, switch channels, portions of data storage) that are arranged according to function or location. By way of example, a network administrator can use conventional vendor-supplied (i.e., manufacturer supplied) storage network management software to configure a zone of ports (data communications channels or paths) within that vendor's data switch to associate selected servers in the data storage network with selected data storage resources in the storage area network.

Thus, the network administrator might, for example, define a zone to include a server or group of servers, a dedicated channel through the data switch (via allocation of one or more ports), and an amount of data storage space in the form of one or more volumes of storage maintained within one or more of the data storage systems. An administrator might create many zones in the storage network, for example, for each department (e.g., engineering, accounting, human resources, and the like) within a company.

A data switch (or one or more switches) that channels requests for data between the host resources (e.g., servers) and various data storage devices is generally responsible for zone enforcement. During operation of a typical data switch, each port within the data switch can be dedicated to transferring data to and/or from a single respective data storage system or server computer system.

To create a zone, a network manager typically utilizes vendor zone management software to establish a grouping of one or more server ports (i.e., connections between the data switch and a server) with one or more data storage system ports (i.e., connections between the data switch and a data storage system) together into a zone. Generally, resources (servers, switch ports, and portions of data storage systems) within the same zone can "see" or access each other, while resources in different zones cannot access each other. As an example, a server in a first zone can access data storage in the first zone, but not data storage allocated to other zones if it is not a member of other zones. Thus, as discussed, zoning in the context of storage networks operates as a form of access control and provides an organized mechanism of managing and associating amounts of data storage to specific computer systems.

To create or modify a given zone of a storage area network, a network manager provides zone configuration data to a switch resource indicating how to configure respective zones in the switch. Certain conventional applications do not limit the number of remote network managers that are able to modify the zones in the storage area network from different remote locations. Thus, two or more users may modify the same zone or zones of the storage area network.

SUMMARY

Conventional network management applications that support management of network resources such as zones suffer from a variety of deficiencies. For example, as discussed, conventional zone manager applications enable multiple users at different remote locations to modify existing zones in the storage area network. However, conventional zone manager applications do not always, if at all, take into account modifications by another party modifying the same zone configuration information.

For example, a first network manager may extract current configuration settings of a given zone in the storage area network and modify the current configuration settings of the given zone. The first network manager may then apply the changes to override the current zone configuration settings. In the meantime, a second network manager may have extracted the same current configuration settings for the zone (prior to changes by the first network manager) and attempt to modify the same zone. Without an accounting for the first network manager's changes to the given zone, the second network manager may overwrite configuration settings applied by the first network manager. Thus, network managers must be mindful that other network managers (or other management entities) may overwrite their changes and that applied zone changes may be lost at any time when there are two or more network manager competing to change the configuration settings of the same zone.

Accordingly, network administrators of a storage area network application typically need to know if zoneset information (e.g., zoning configuration information) as identified in a local database and as viewed on a display screen is different than that currently implemented on switches in a storage area network fabric. In other words, a network administrator relies on zone configuration information in a local database to identify current zone settings of switches in a respective storage area network. If actual zone configuration settings at the switches are different than that identified in the zone configuration information in the local database, a network administrator needs to know that zone configuration information in the local database is out of date. The network administrator can decide which set of zone configuration information (e.g., zone configuration information in the local database or zone configuration information currently used to configure the switch) to configure the storage area network switches and take appropriate actions to keep the two sets of zone configuration information in a synchronized state. Preferably, the network administrator can quickly detect when zone configuration information in the local database is out of sync with respect to the zone configuration information implemented on the switches in the storage area network fabric.

A conventional technique for an application to detect the difference in zone configuration information is to import the entire active zoneset from the fabric through networks such as LANs (Local Area Networks) or WANs (Wide Area Networks) and then compare it with the one in the local database member by member and zone by zone. One problem associated with this comparison technique is performance. Importing a large zoneset from a fabric requires much bandwidth and time. It can take on the order of minutes or more for a storage area network management application to import a large zoneset (e.g., zone configuration information) because such a zoneset can contain more than 1000 zones, each having two or more member resources.

To compound matters, a storage area network management application may need to periodically update active zoneset information in its database such as every 10 minutes or so. If a management control center imports zoneset information too frequently, storage area network application performance will be adversely affected. For example, when zoneset information is imported too frequently, a link between a storage area network management application and switch device (implementing the zone configuration information) will be congested with traffic so that such a link is not available for other uses. Thus, an application should avoid unnecessary importation of active zoneset information when possible.

Increasing system performance involves quickly detecting an occurrence of changes to an active zoneset currently implemented on a switch. If the active zoneset on the switch has not been changed since last importing it to the local database, then it is not necessary to import the active zone configuration information over the storage area network fabric into the local database again.

Techniques discussed herein deviate with respect to conventional network management applications and may overcome certain deficiencies of conventional network management applications as discussed above. For example, embodiments of the invention include mechanisms and techniques for generating checksum values associated with zone configuration information.

An agent in a storage area network queries a switch device to learn of current zone configuration settings applied to the storage area network. Based on zone configuration information retrieved from the switch device, the agent generates a checksum value representing the zone configuration information implemented in the storage area network at this initial snapshot in time. The agent stores the generated checksum value. At a later snapshot in time, the agent again retrieves zone configuration settings of the switch device to determine whether there has been a change to the original zone configuration information. For example, the agent generates a checksum value for the newly retrieved zone configuration information at the later snapshot in time. If the new checksum value for the newly retrieve zone configuration information equals the previously generated checksum value, it is assumed that there has been no change to the zone configuration settings of the storage area network. Conversely, if the new checksum value does not equal the previously generated checksum value, it is assumed that there has been a change to the zone configuration settings of the storage area network.

Generating checksum values as discussed above reduces memory requirements associated with the agent. For example, the agent need only store the checksum value associated with the zone configuration information for a given snapshot in time rather than store the entire set of zone configuration information to determine whether a change occurs to the network configuration information. Typically, a checksum value is on the order of tens or hundreds of bits whereas the zone configuration information can be quite large. Also, to identify a change to zone configuration information, the agent can identify when a change occurs without having to compare the previous and new zone configuration information bit by bit, which is an otherwise tedious process. Instead, the agent relies on detecting differences in checksum values to identify whether there has been a change to zone configuration information in a storage area network. Other benefits of utilizing checksum values will be discussed later in this specification.

In view of the above example, a general embodiment herein is therefore directed to a technique for generating a checksum value associated with configuration settings of a network. For example, an agent (or other processor entity) receives network configuration information associated with a network. The agent processes the network configuration information to identify a hierarchy of objects (e.g., entities such as a zoneset, zones, members, aliases, etc.) associated with the network. The agent then applies one or more algorithms to objects at different levels of the hierarchy of objects to generate a substantially unique checksum value associated with the network configuration information. Consequently, the agent generates a unique checksum value (or quasi-unique checksum value) to represent the hierarchy of objects. Changes to the hierarchy or, more generally, the network configuration information results in generation of different checksum values by the agent. This enables the agent to identify when there has been a change to the zone configuration information such as a change to the hierarchy itself, a change to an object in the hierarchy, a change to a name associated with an object, etc.

According to one embodiment herein, the network configuration information received by the agent is zone configuration information associated with a storage area network. The zone configuration information includes a hierarchy of objects. For example, the agent processes the network configuration information to i) identify a zoneset associated with the storage area network, ii) identify multiple zones associated with the zoneset, and iii) identify at least one respective zone member associated with each of the multiple zones. In this instance, the network configuration information defines a relationship of objects via the hierarchy. For example, the zoneset resides at a respective root of the hierarchy. The zoneset includes one or more zones that reside at a level beneath the root level of the hierarchy. Each zone includes one or more members (e.g., zone members) or aliases that reside at a level beneath the zone level of the hierarchy. Each alias can include one or more alias members.

As discussed above, the agent can apply multiple different algorithms to generate an overall checksum value associated with a set of zone configuration information. For example, according to one embodiment, the agent applies a first algorithm to network configuration information to generate a first portion (e.g., a 32 bit value) of an overall checksum value associated with a zoneset of a storage area network. Further, the agent applies a second algorithm to the same network configuration information to generate a second portion (e.g., a 32 bit value) of the overall checksum value associated with the zoneset of the storage area network. The agent then concatenates the first portion and the second portion to produce the overall checksum value (e.g., a 64 bit value) associated with the network configuration information (e.g., zoneset). Thus, according to one embodiment, the overall checksum generated by the agent is redundant to the extent that it includes two portions, each of which is a unique value generated based on the same network configuration information.

To generate a checksum value associated with the network configuration information, the agent applies one or more algorithms to multiple levels of the hierarchy of objects. For example, the agent generates a first checksum value for an object at a first level of the hierarchy. Additionally, the agent generates a second checksum value at a second level of the hierarchy. Thereafter, the agent utilizes the first checksum value and the second checksum value to generate the overall checksum value associated with, for example, a zoneset as defined by the network configuration information and the associated hierarchy of objects.

According to one embodiment, the agent produces the same checksum value for a set of network configuration information regardless of an order of processing multiple objects at a given level of the hierarchy. In other words, the agent produces the same checksum value regardless of whether the network configuration information identifies that a respective zone in the zoneset includes members A, B, and C or whether the network configuration information identifies that the respective zone includes members B, C and A. In contradistinction, conventional methods produce two different checksum values in this case. A drawback of producing different checksum values is that the different checksum values erroneously indicate that there has been a change to a zone in a zoneset when technically there has been no change to the zone other than an ordering of its members.

Although a change to an ordering of members in a zone does not result in generation of a different checksum values according to an embodiment herein, moving a member from one zone in the hierarchy to another causes the agent to produce a different checksum value. For example, assume that a first set of network configuration information is identical to a second set of network configuration information with the exception that a member initially residing in a first zone of the first set of network configuration information is moved to a second zone in the second set of network configuration information. In this case, the agent generates a checksum value associated with the first set of network configuration information that is different than a checksum value generated for the second set of network configuration information. Accordingly, the agent can detect this change and properly notify other entities of the occurrence of this substantial change (e.g., moving a member from one zone to another in a zoneset) to a respective zoneset represented by the network configuration information.

As discussed, techniques of the invention are well suited for use in applications in which it is useful to know whether there has been a change to zone configuration data of a storage area network. However, it should be noted that embodiments of the invention are not limited to use in such applications and thus embodiments of the invention are well suited for other applications as well. For example, techniques described herein can be used to generate checksum values for any type of network configuration information to identify whether a change has occurred.

Other embodiments herein include a computerized device (e.g., a host computer, workstation, etc.) configured to support the aforementioned method operations to generate checksums associated with zone configuration information. In such embodiments, the computerized device includes a memory system, a processor (e.g., a processing device) and an interconnect. The interconnect supports communications among the processor and the memory system. The memory system is encoded with an application (e.g., an agent application) that, when executed on the processor, produces a process that generates checksum values for detecting whether there has been a change to zone configuration data of a storage area network.

Yet other embodiments herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation of checksum values as explained herein. The computer program logic, when executed on at least one processor of a computing system, causes the processor to perform the operations (e.g., the methods) indicated herein. Such arrangements are typically provided as software, code and/or other data structures arranged or encoded on a computer readable medium such as an optical medium (e.g., CD-ROM), floppy or hard disk, or other medium such as firmware or microcode in one or more ROM or RAM or PROM chips, or as an Application Specific Integrated Circuit (ASIC), or as downloadable software images in one or more modules, shared libraries, etc. The software or firmware or other such configurations can be installed onto a computerized device to cause one or more processors in the computerized device to perform the techniques explained herein.

One more particular embodiment of the invention is directed to a computer program product that includes a computer readable medium having instructions stored thereon for supporting management of network resources such as generating checksum values. The instructions, when carried out by a processor of a respective computer device, cause the processor to perform the steps of: i) receiving network configuration information associated with a network; ii) processing the network configuration information to identify a hierarchy of objects associated with the network; and iii) applying at least one algorithm to different levels of the hierarchy of objects to generate a substantially unique checksum value associated with the network configuration information. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center software application that provides graphical management functionality for storage area network resources and in computerized devices that operate the Control Center software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

An embodiment herein includes a technique of generating checksum values for synchronizing zone configuration data used to configure a zone of a storage area network. A user initially retrieves configuration data utilized to configure a zone of a storage area network. The user modifies a copy of the configuration data for the purpose of eventually changing the configuration of the zone in the storage area network. In the meantime, a source other than the user may have modified the configuration of the zone such that there is mismatch between the snapshot of configuration data initially retrieved by the user and present configuration data currently used to configure the zone of the storage area network.

When an entity such as the user requests to activate a modified version of zone configuration data, an agent in the storage area network checks for the above condition to determine whether the zone configuration data currently used to configure the zone is the same as the previously taken snapshot of zone configuration data retrieved by the user. For example, the agent initially generates and stores a checksum value (e.g., a unique identifier or quasi-unique identifier) based on the initial configuration data. Upon request by the user to change the configuration of the zone via use of the user-modified snapshot of configuration data, the agent retrieves (e.g., from a switch device in the storage area network) zone configuration data currently used to configure the zone and produces a corresponding checksum based on the newly retrieved zone configuration data. The agent compares the newly generated checksum associated with the currently applied zone configuration data to the previously generated and stored checksum associated with the previously applied zone configuration data for that zone. If the checksum values match, the agent notifies the user that there has been no change to zone configuration data. If the checksum values do not match, the agent notifies the user that there has been a configuration change to the zone since taking the snapshot. The agent then presents the user with options of enabling the user to overwrite the currently applied zone configuration settings with the user generated modifications or update the user's database with configuration settings currently applied to the zone. In this way, the agent facilitates synchronization of zone configuration data in the storage area network.

Figure 1:
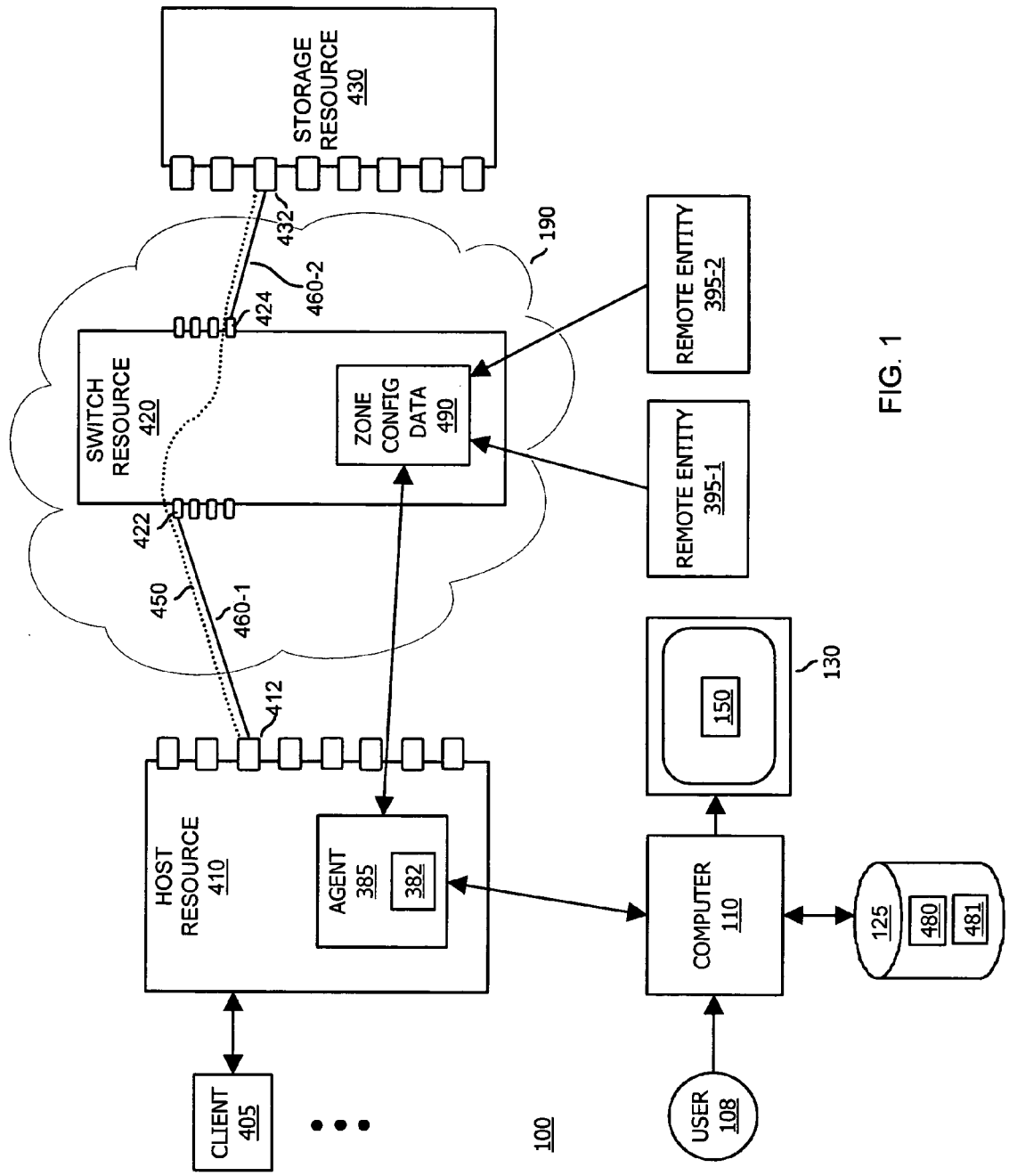
FIG. 1 is a block diagram of a storage area network according to an embodiment herein.

FIG. 1 is a diagram illustrating use of an agent 385 (e.g., a software agent) in a storage area network environment 100 to identify when a third party such as a remote entity 395 modifies configuration settings (e.g., zone configuration data) of a zone or zoneset according to an embodiment herein.

As shown, zone 450 includes resources members associated with switch resource 420 and elements of network 190 that can "see" each other. More particularly, zone 450 enables transmission of data along a logical path from port 412 of host resource 410 through link 460-1 (e.g., a fiber channel) to switch port 422 of switch resource 420. Further, zone 450 enables transmission of data along a logical path from switch port 424 of switch resource 420 through link 460-2 (e.g., a fiber channel) to port 432 of storage array resource 430.

Via use of zone 450, client 405 (e.g., a software application) can request retrieval of data through host resource 410. If client 405 has sufficient access rights, host resource 410 (e.g., a server of the data) retrieves the data on behalf of client 405 from storage resource 430 via communications supported by zone 450.

Zone configuration data 490 in switch resource 420 defines attributes of zone 450. For example, among other things, zone configuration data 490 includes a listing of zone members (e.g., port 412 of host 410 and port 432 of storage array 430, etc.) associated with the zone 450. Thus, switch resource 420 configures zone 450 based on application of zone configuration data 490.

As previously discussed, both computer 110 and remote entity 395 (e.g., a vendor supplied zone application software corresponding to the type of switch resource 420) can generate, modify, and transmit zone configuration data 490 to switch resource 420 for configuring zones of switch resource 420. Remote entity 395 can initiate a change to zone configuration data 490 without notifying computer 110 of the change. Accordingly, zone configuration data 480 stored at computer 110 may not always reflect actual zone settings in network 190.

In one embodiment, computer 110 retrieves a copy of the zone configuration data 490 used to configure zone 450 of the storage area network 300 at an initial snapshot in time. Computer 110 stores the copy of zone configuration data 490 in database 125 (e.g., a data repository) or in cache of computer 110 as zone configuration data 480. The user 108 can modify locally stored zone configuration data 480 and initiate a change to a configuration of zone 450. For example, the user 108 can modify (e.g., via use of a graphical user interface 150 and display screen 130 associated with computer 110) the zone configuration data 480 retrieved from database 125 to display zone attributes of zone 450 and produce user-generated zone configuration data, which will eventually be applied to change a configuration of zone 450.

Prior to implementing user-generated zone configuration data, the computer 110 initiates agent 385 to check and provide a notification whether the zone 450 is no longer configured according to the locally stored zone configuration data 480. For example, either or both of remote entities 395 may have modified zone configuration data 490 after the snapshot in time when computer 110 stores zone configuration data 480 in database 125. Accordingly, locally stored zone configuration data may be out of sync with respect to zone configuration data 490.

Conflicts can occur when user 108 attempts to modify zone configuration data 490 without accounting for changes by remote entity 395. For example, as briefly discussed, upon instantiation of zone 450 at time, t1, agent 385 forwards corresponding zone configuration data 490 for storage in database 125 as zone configuration data 480. At this time, t1, agent 385 employs checksum generator 382 to generate checksum value 481 based on contents of retrieved zone configuration data 490. Agent 385 forwards the checksum value 481 to computer 110 that, in turn, stores the checksum value 481 in database 125 along with zone configuration data 480.

Agent 385 also stores the checksum value 481 locally in corresponding memory of host resource 410 or other repository such as agent's cache. Consequently, agent 385 can identify changes to zone 450 by retrieving present zone configuration data 490 associated with zone 450, generating a checksum value based on contents of the retrieved zone configuration data 490 from switch resource 420, and comparing the generated checksum value to the previously stored identifier 481 for a given zone or zoneset. If there is no match based on the comparison, the agent 385 concludes that zone configuration data 480 is not the same as zone configuration data 490 and that the remote entity 395 (or some other source) modified the zone configuration data 490 after time t1 and that user 108 at computer 110 needs to be notified of the change.

In this circumstance when agent 385 detects a change to zone configuration data 490 (or that zone configuration data 490 and zone configuration data 480 are out of sync with respect to each other), agent 385 stores the newly generated checksum value for the zone configuration data 490 and notifies computer 110 of the detected change to zone configuration data 490 and thus zone 450. In furtherance of the notification of the changes to computer 110, agent 385 forwards a copy of the current zone configuration data 490 and newly generated checksum value to computer 110 for storage in database 125. Thus, agent 385 updates database 125 with the most recent zone configuration data so that user 108 does not view out-of-date zone configuration data.

In response to receiving a command from user 108 to apply user-generated zone configuration data to switch resource 420, the computer 110 transmits the user-generated zone configuration data to agent 385 that, in turn, utilizes the user generated zone configuration data to change a configuration of zone 450 in the storage area network environment 100.

This process of synchronizing zone configuration data 480 in database 125 and zone configuration data 490 presently used to configure switch resource 420 ensures that user 108 has knowledge of changes to the zone 450 when remote entity 395 does not explicitly communicate with computer 110 of the changes. In other words, in this embodiment, remote entity 395 does not explicitly provide any notification to computer 110 of an occurrence of changes to zone configuration data 490. Instead, agent 385 monitors zone configuration data 490 for changes by vendor zone manager application 395 and notifies computer 110. Since agent 385 only stores a checksum value of corresponding previously implemented zone configuration data 490 (instead of the zone configuration data 490 itself), agent 385 requires use of less memory storage resources for its cache. Note that in one embodiment, agent 385 stores checksum values for many zones or zonesets associated with switch resource 420 and network 190.

Figure 2:
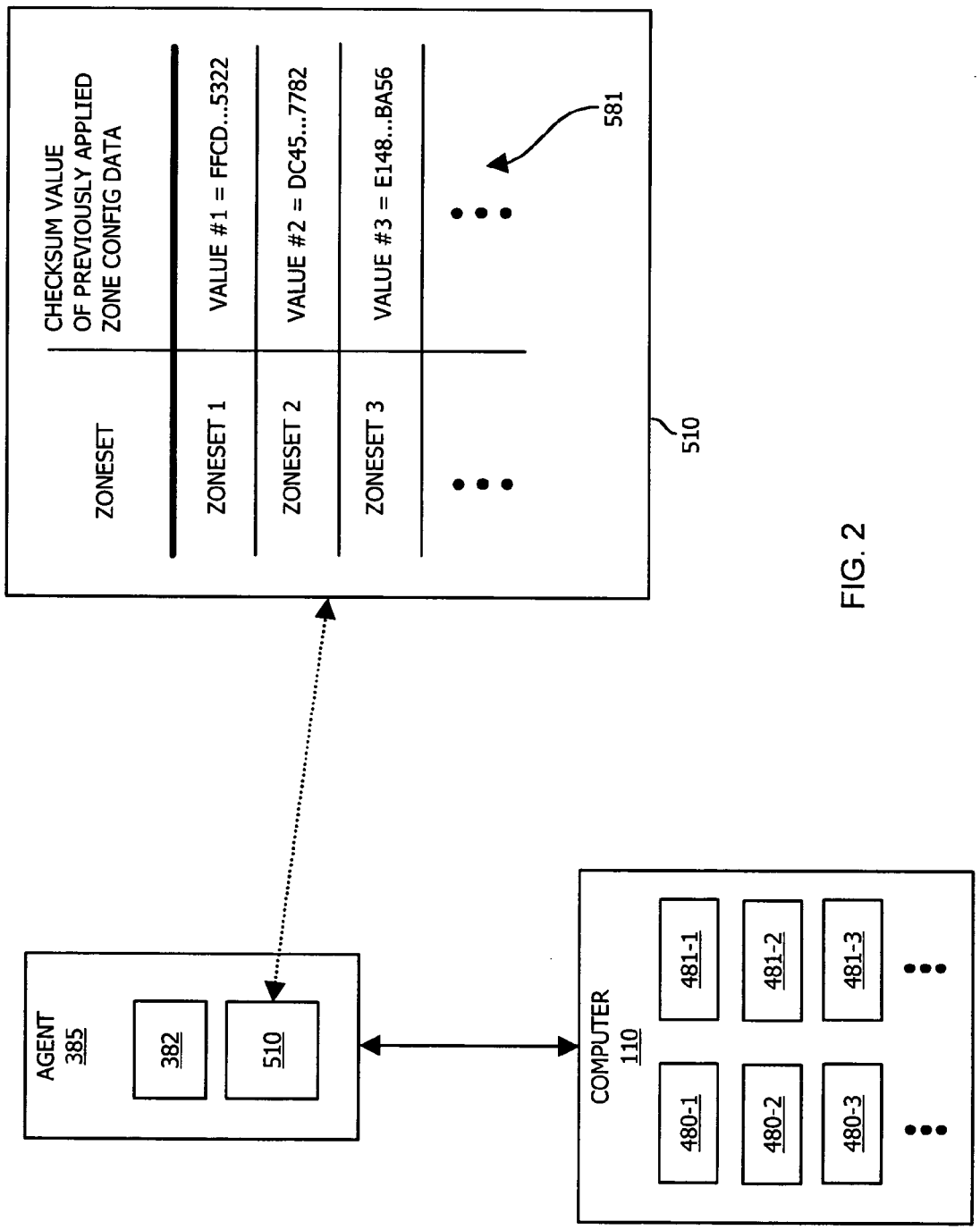
FIG. 2 is a diagram illustrating use of an agent (e.g., a software agent in a storage area network) to identify when a third party modifies configuration settings of a zone according to an embodiment herein.

FIG. 2 is a diagram illustrating respective data stored by an agent 385 and computer 110 according to an embodiment of the invention. As shown, agent 385 stores checksum values 481 derived from sets of zone configuration data previously applied to the storage area network 100. As previously discussed, computer 110 (or database 125) stores respective copies of zone configuration data 480 (e.g., zone configuration data 480-1, zone configuration data 480-2, zone configuration data 480-3, ...) applied to respective zones of storage area network 300 as well as corresponding checksum values 481 (e.g., checksum value 481-1, checksum value 481-2, checksum value 481-3, ...), which are generated by agent 385 for each respective set of zone configuration data 480 (e.g., zone configuration data of a zoneset). Consequently, as agent 385 discovers newly applied zone configuration data in switch resource 420 for a given zone, agent 385 i) updates computer 110 and ii) updates its local cache 510 with checksum values 581.

In one embodiment, agent 385 occasionally or periodically retrieves zone configuration data associated with a given zoneset in storage area network to identify when a change occurs to current zone configuration settings for the purpose of notifying computer 110 of such a condition. In another embodiment, the agent 385 automatically checks for configuration changes to zone 450 when user 108 attempts to modify attributes of a zone as discussed above.

If a change is detected based on the comparison method discussed above, agent 385 presents the user 108 with an option of i) exporting the user generated zone configuration data to configure zone 450 overwriting current configuration settings of the zone 450, or ii) importing zone configuration data 490 currently used to configure zone 450 and storing the zone configuration data 490 in database 125 as zone configuration data 480 along with an appropriate checksum value 481 as generated by the agent 385. In a further possible embodiment, agent 385 prompts the user 108 with an option of aborting application of user modified zone configuration data to the zone 450.

As discussed, embodiments of the invention include a technique of resolving an "out-of-sync" condition for zoning activation (application of modified zoning configuration) in a switch fabric of a storage area network. Note that further embodiments are applicable to discovery and/or rediscovery of currently active zoning in a fabric component such as switch resource 420. For example, when agent 385 discovers a new current zoning configuration (e.g., of a zone in a switch fabric), the agent 385 notifies computer 110 of the condition. The computer 110 via display screen 130, in turn, notifies the user 108 of the change and provides an option of not automatically importing the current zoning configuration to the computer 110, but instead receiving an alert (from agent 385) that the current zoning configuration of zone 450 is different from a last seen/activated/imported configuration.

In one embodiment, when agent 385 detects a change to zone configuration data in switch resource 420 (e.g., via periodic or random polling), the agent 385 in conjunction with computer 110 provides the user 108 with an option of reviewing any differences to the zone configuration data in switch resource 420 before finally making a decision whether to import new current zoning configuration data or not. In other word, the computer 110 identifies and displays differences between old zone configuration data and new zone configuration data for purposes of notifying the user 108 of such differences.

Figure 3:
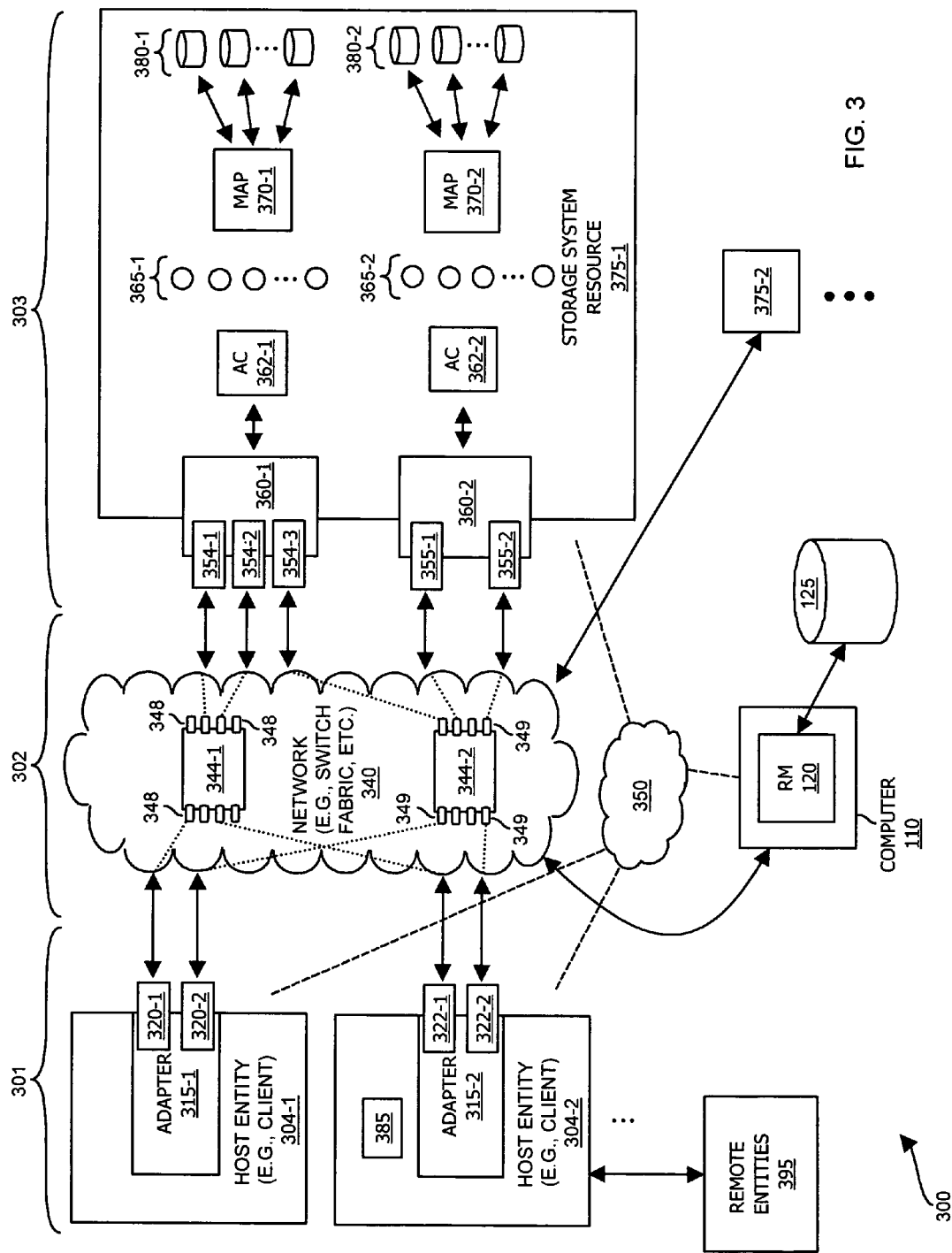
FIG. 3 is a block diagram illustrating a relationship between host resources, switch resources, and storage resources according to an embodiment herein.

FIG. 3 is an example block diagram illustrating connectivity of network resources (e.g., host resources 301, switch resources 302, and storage resources 303) in a storage area network environment 300 according to an embodiment herein. The above techniques of utilizing an agent 385 to generate checksum values can be employed in such an environment.

As shown, storage area network 300 includes host entity 304-1, host entity 304-2, . . . (collectively, host entities 304), network 340 (e.g., a high speed fiber based switch fabric), network 350 (e.g., LAN, WAN, Internet, intranet, etc. supporting communications based on a TCP/IP protocol), storage system resource 375-1, storage system resource 375-2, . . . (collectively, storage system resources 375), computer system 110, and database 125. Network 340 includes switch device 344-1, switch device 344-2 and corresponding switch ports 348 and 349. Host entity 304-1 includes adapter 315-1 and corresponding port 320-1 and port 320-2 to communicate over network 340. Host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, host entities 304 access data in storage system resources 375 on behalf of clients. As an example, a client communicates with host entity 304-1. Host entity 304-1 couples to network 340 via adapter 315-1 and corresponding ports 320 (e.g., port 320-1 and port 320-2). Ports 320 couple to respective ports 348 and 349 on switch devices 344 (e.g., switch device 344-1 and switch device 344-2). In turn, ports 348 and 349 of switch devices 344 couple to ports 354 (e.g., port 354-1 port 354-2, and port 354-3) and 355 (e.g., port 355-1 and port 355-2) of corresponding storage system resources 375.

Storage system resource 375-1 includes access controllers 362 to facilitate access to corresponding storage devices 365 (e.g., logical storage space). Storage devices 365 (e.g., storage device 365-1 and storage device 365-2) are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 is limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300 as previously discussed via FIGS. 1 and 2 and corresponding text above. Agent 385 and, more specifically, checksum generator 382 of agent 385 generates checksum values to identify when there has been a change to zone configuration data associated with network 340.

Figure 4:
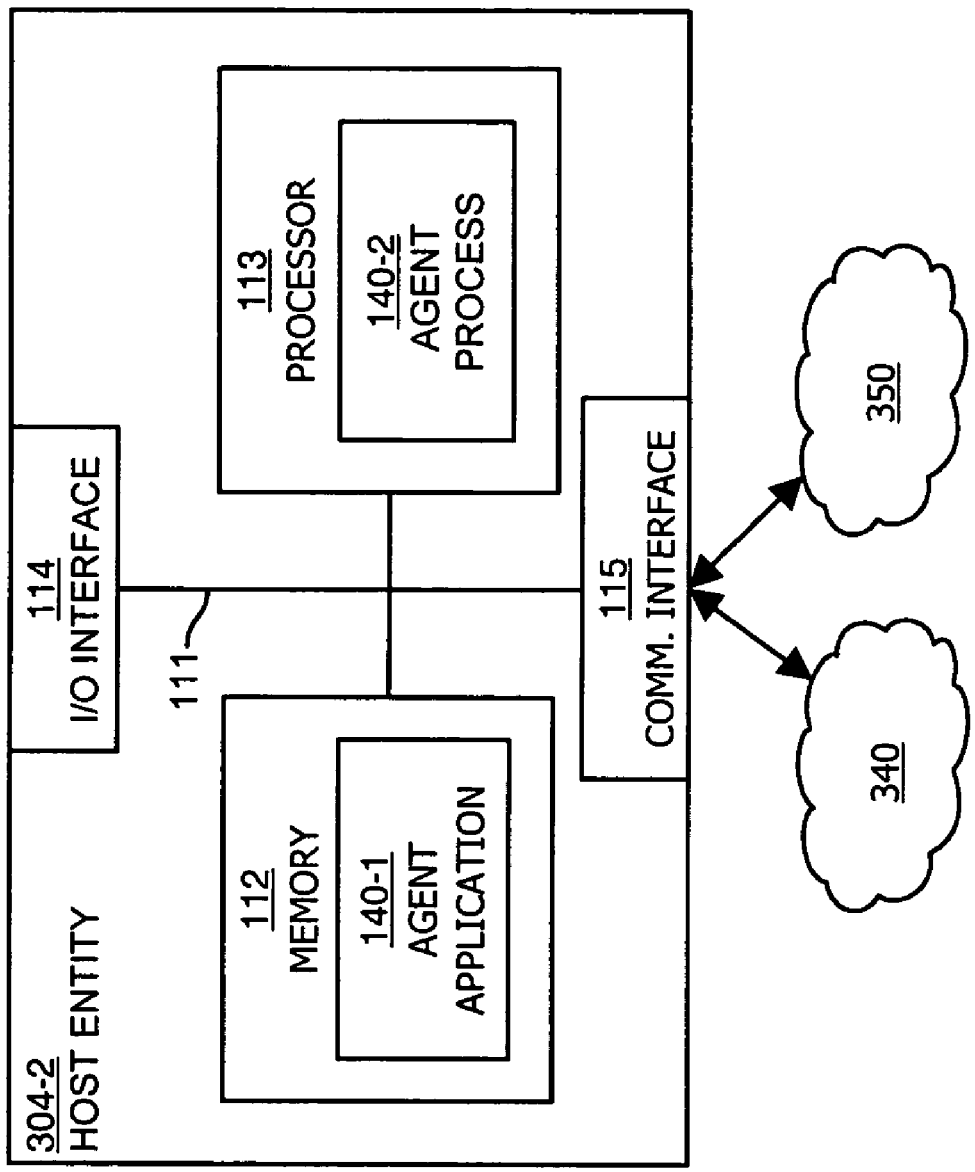
FIG. 4 is a block diagram of a processing device suitable for executing techniques according to an embodiment herein.

FIG. 4 is a block diagram illustrating an example architecture of host entity 304-2 according to an embodiment herein. Host entity 304-2 may be a computerized device such as a personal computer, server, workstation, portable computing device, console, network terminal, etc. As shown, host entity 304-2 of the present example includes an interconnect 111 that couples memory 112, a processor 113, an input/output interface 114 and a communications interface 115. Communications interface 115 of host entity 304-2 enables agent process 140-2 to communicate with other devices (i.e., resources) associated with networks 340 and 350. Memory 112 is encoded with agent application 140-1 supporting retrieval of zone configuration data and generation of respective checksum values as previously discussed.

Agent application 140-1 may be embodied as software code such as data and/or logic instructions (e.g., code stored in the memory or on another computer readable medium such as a disk) that supports processing functionality according to different embodiments as described herein. During operation, processor 113 accesses memory 112 via the interconnect 111 in order to launch, run, execute, interpret or otherwise perform the logic instructions of the agent application 140-1. Execution of agent application 140-1 produces processing functionality in agent process 140-2. In other words, the agent process 140-2 represents one or more portions of the agent application 140-1 (or the entire application 140-1) performing within or upon the processor 113 in the computerized device 110.

It should be noted that embodiments of the invention include the agent application 140-1 itself (i.e., the un-executed or non-performing logic instructions and/or data). The agent application 140-1 may be stored on a computer readable medium such as a floppy disk, hard disk or in an optical medium. The agent application 140-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the invention include the execution of agent application 140-1 in processor 113 as the agent process 140-2. Thus, those skilled in the art will understand that the host entity 304-2 may include other processes and/or software and hardware components, such as an operating system that controls allocation and use of hardware resources.

It should also be noted that the agent (e.g., agent 385 as shown in FIGS. 1-3) executed in host entity 304-2 is represented in FIG. 4 by either one or both of the agent application 140-1 and/or the agent process 140-2. For purposes of the discussion of the operation of embodiments of the invention, general reference will be made to the agent 385 as performing or supporting the various steps and functional operations discussed herein.

Functionality supported by host entity 304-2 and, more specifically, agent 385 will now be discussed via flowchart 500 in FIG. 5. Note that there will overlap with respect to concepts discussed above for FIGS. 1 through 4.

Figure 5:
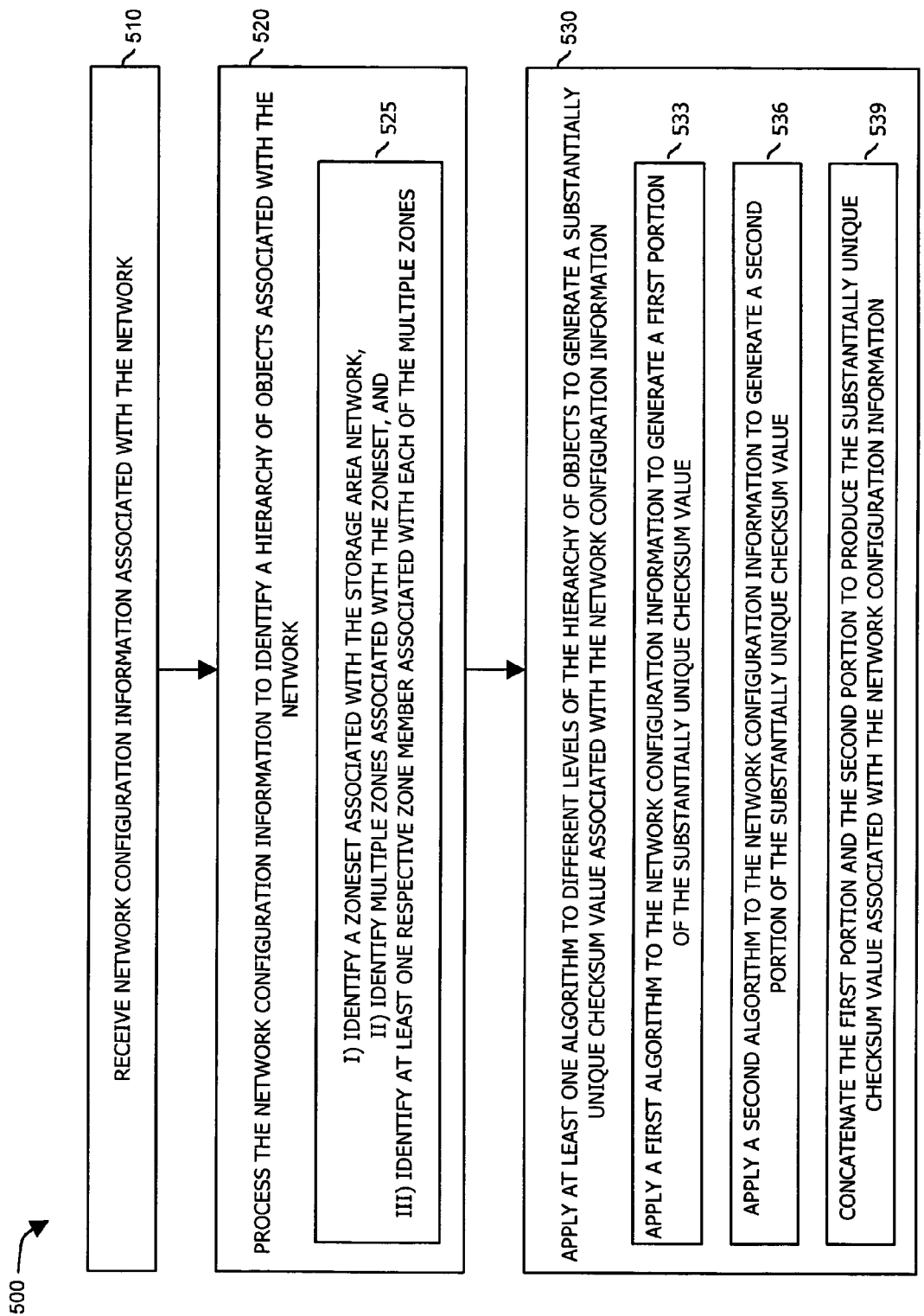
FIG. 5 is a flowchart illustrating a general technique of generating a checksum value according to an embodiment herein.

FIG. 5 is a flowchart 500 of processing steps performed by agent 385 according to an embodiment herein. In general, flowchart 500 illustrates how agent 385 generates checksum values to identify an occurrence of changes to zone configuration data 490 applied to a storage area network.

In step 510, the agent 385 receives (or retrieves) network configuration information (e.g., zone configuration data 490) associated with the network 190 and, more specifically, switch resource 420 of FIG. 1.

In step 520, the agent 385 processes the network configuration information to identify a hierarchy of objects associated with the network configuration information.

For example, in step 525, the agent 385 i) identifies a zoneset associated with the storage area network 190, ii) identifies multiple zones associated with the zoneset, and iii) identifies multiple zone members associated with each of the multiple zones.

In step 530, the agent 385 applies one or more algorithms to different levels of the hierarchy of objects to generate a substantially unique checksum value associated with the retrieved network configuration information.

In substep 533 of step 530, the agent 385 applies a first algorithm to the network configuration information to generate a first portion of the substantially unique checksum value.

In substep 536 of step 530, the agent 385 applies a second algorithm to the network configuration information to generate a second portion of the substantially unique checksum value.

In substep 539 of step 530, the agent 385 concatenates the first portion (e.g., a 32 bit checksum value) and the second portion (e.g., a 32 bit checksum value) to produce the substantially unique checksum value (e.g., a 64 bit checksum value) associated with the network configuration information.

Figure 6:
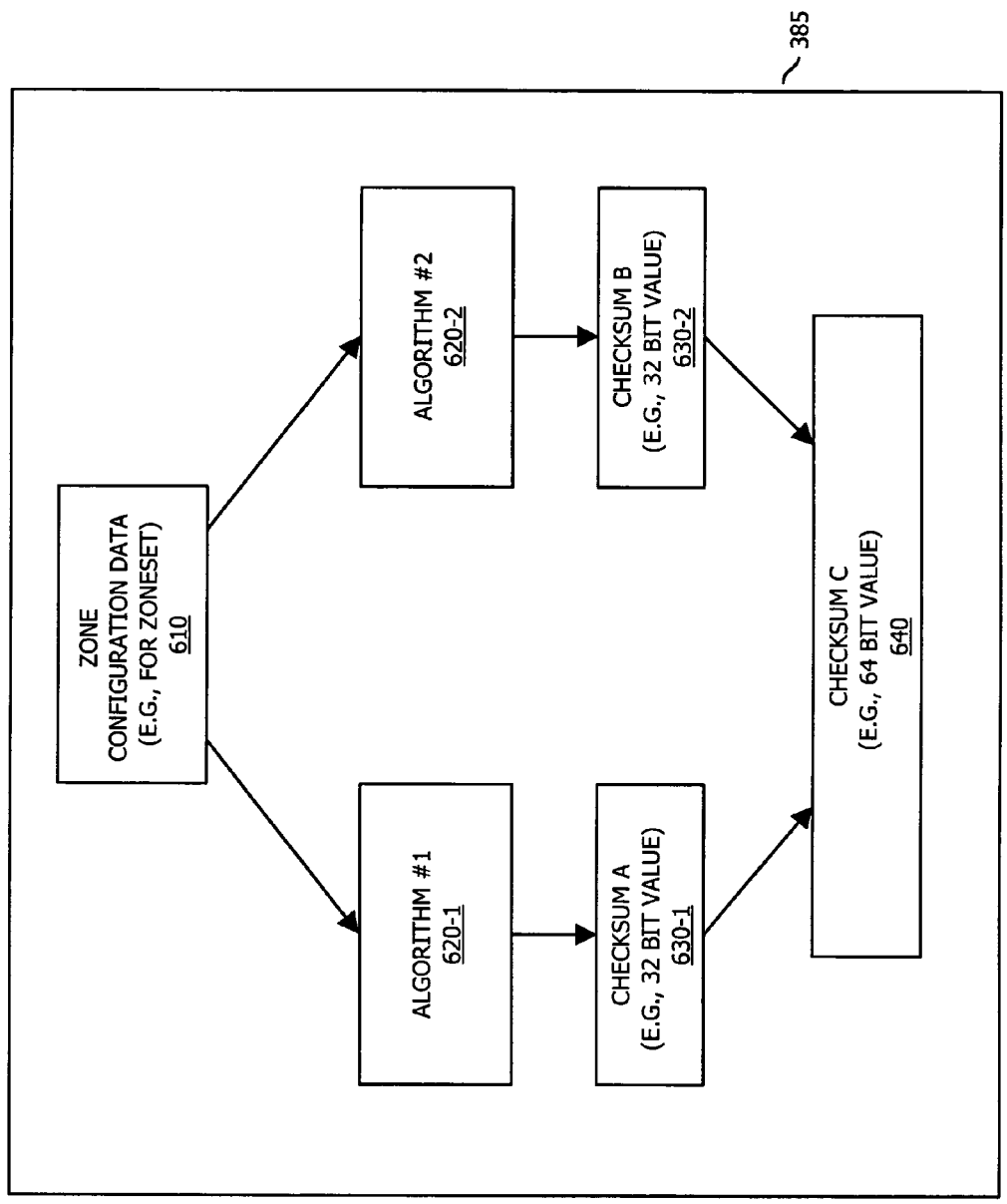
FIG. 6 is a diagram illustrating an agent and a respective technique of generating a double checksum value according to an embodiment herein.

FIG. 6 is a diagram illustrating a technique utilized by agent 385 to generate a checksum value for a set of zone configuration data 610 according to an embodiment herein. As shown, agent 385 applies a first algorithm 620-1 and second algorithm 620-2 to generate respective checksum value 630-1 (e.g., a 32 bit checksum value) and checksum value 630-2 (e.g., a 32 bit checksum value) based on zone configuration data 610. Thereafter, agent 385 produces checksum value 640 (e.g., a 64 bit checksum value) by concatenating checksum value 630-1 and checksum value 630-2.

In one embodiment, the first algorithm and the second algorithm 620-2 operate independently of each other and are thus two different algorithms applying different bit-processing techniques. Since the algorithms 620 are different, they each produce a different checksum value for a given set of zone configuration data 610. Thus, in some respects, checksum value 640 is a double checksum value. This checksum value redundancy reduces the possibility that the agent 385 does not detect when a change occurs to zone configuration data 610.

For example, it is possible that two different sets of zone configuration data produce the same checksum value for a given one of the two algorithms. However, since the two algorithms are different, there is less of a chance that both the algorithms 620 will produce the same respective checksum values for two different sets of zone configuration data. Accordingly, the agent 385 can identify with greater precision when a change occurs to zone configuration data by identifying that at least one of the double checksum values associated with a first set of zone configuration data does not match a respective double checksum value associated with a second set of zone configuration data. Conversely, the agent 385 identifies that two sets zone configuration data are the same when the both sets of zone configuration data each produce the same overall checksum values.

Figure 7:
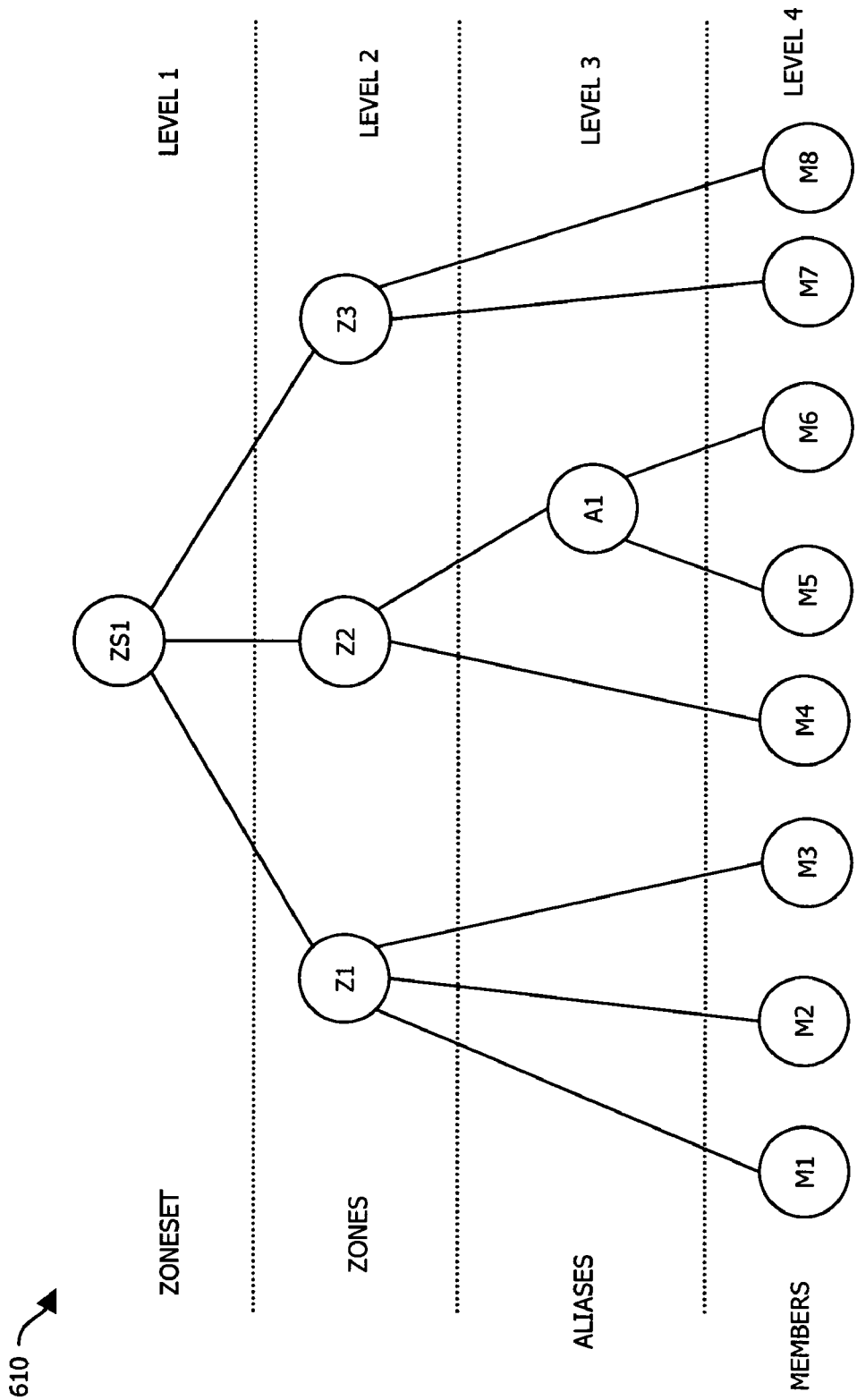
FIG. 7 is a diagram illustrating zone configuration data including a hierarchy of objects according to an embodiment herein.

FIG. 7 is a diagram illustrating zone configuration data 610 including a hierarchy of objects according to an embodiment herein. As shown, objects in the hierarchy of zone configuration data 610 include zoneset ZS1, zone Z1, zone Z2, zone Z3, member M1, member M2, member M3, member M4, alias A1, member M7, member M8, member M5, and member M6. The zoneset ZS1 includes zones Z1, Z2, and Z3. Zone Z1 includes members M1, M2, and M3. Zone Z2 includes member M4 and alias A1. Alias A1 includes members M5 and M6. Zone Z3 includes members M7 and M8.

A zone can include different types of members. For example, object members of the hierarchy can be identified by a node WWN (World Wide Name such as a 64 bit value in the form AAAA.BBBB.CCCC.DDDD), switch port WWN, a domain ID (of a respective switch device) and port number (of the respective switch device), and a FCID (e.g., a 24 bit Fiber Channel ID), etc.

Referring again to FIG. 1 as an example, zone 450 includes multiple members such as ports of host resource 410 (e.g., a server) and ports of storage resource 430. More particularly, according to one embodiment, zone 450 includes members such as port 412 of host resource 410, link 460-1 (e.g., a fiber channel identified by a respective FCID), and switch port 422 of switch resource 420. Further, zone 450 includes switch port 424 of switch resource 420, link 460-2 (e.g., a fiber channel identified by a respective FCID), and port 432 of storage array resource 430.

As discussed, agent 385 generates checksum values associated with different zonesets to identify whether there has been a change to zone configuration data such as when the zone configuration data are different from each other. For example, instead of obtaining and comparing two entire zonesets, member by member and zone by zone, agent 385 obtains and compares checksum values associated with the zonesets to detect differences or changes to zonesets. If checksum values for two zonesets do not match, then agent 385 can be sure that these two zonesets are different. Conversely, according to one embodiment, if respective checksum values for two zonesets are the same, then agent 385 can assume that the two zonesets are the same with a very high certainty. This improves application performance.

Conventional checksum techniques have been used to calculate a checksum for a one-dimensional stream of bits or bytes. Zoning configuration in the present embodiment is different than a one-dimensional array of bytes to the extent zone configuration data is a hierarchical organization of zoning objects (e.g., zonesets include zones, which include aliases and members, while aliases include members). Also, note that a difference in an ordering of zones in a zoneset, or an ordering of members included in a zone or in a zoning alias does not change a meaning of zoning configuration nor does it produce a different checksum value. That is, changing an ordering of objects in zone configuration data results in a syntactic difference, not a semantic difference to the zoneset. As an example, zone Z1 can be defined as including members M1, M2, and M3, which is syntactically different but semantically the same as including members M2, M3 and M1.

According to embodiments herein, zoning checksum algorithms can satisfy the following additional requirements:

1. Two equal sets of zoning configuration data will produce equal checksum values.
2. Two different sets of zoning configuration data will most likely produce different checksum values. Failing to detect a difference in zoning configuration data may cause an unnoticed failure of data path at a customer data center. To avoid these issues, the algorithms include unique bit operations to ensure very high accuracy.
3. The algorithm quickly generates a checksum value for a given set of zone configuration data.
4. As mentioned above, an ordering of children in the same container (e.g., children nodes having the same parent) should not affect the checksum value. For example, agent 385 will produce a same checksum value regardless of an ordering of members in an alias, an ordering of members and aliases in a zone, and an ordering of zones in a zoneset.

5. The agent 385 takes into account a grouping of members as well as names of zoning objects in a respective checksum calculation.
6. World Wide Names (WWNs) are basic building blocks of zoning configurations. Such names usually differ from each other only by a few bits due to well defined WWN format. Thus, most of the bits in two WWN names are equal for all the ports of switches of the same vendor type. Even more bits are the same in WWN names associated with ports in the same switch device. The algorithms focus bit operations in these areas to ensure that even slight changes to zone configuration data results in producing different checksum values.
7. The algorithms produce, with especially high probability, different checksum values for typical user changes in a zoning configuration data such as change of a couple of characters in a name, moving members from one zone to another, swapping devices with a WWN very similar to replaced one and so on.

Agent 385 utilizes the following two algorithms (e.g., algorithm 620-1 and algorithm 620-2) to generate checksum values for respective sets of zone configuration data.

Algorithm #1

Agent 385 utilizes algorithm 620-1 (i.e., algorithm #1) to calculate checksum 630-1. As mentioned, a zoneset consists of zoneset/zones/alias names and WWN/Port members. Names and members are actually an array of bytes as previously discussed. Algorithm 620-1 calculates a checksum value 630-1 from the array of bytes associated with the zone configuration data.

Figure 8:
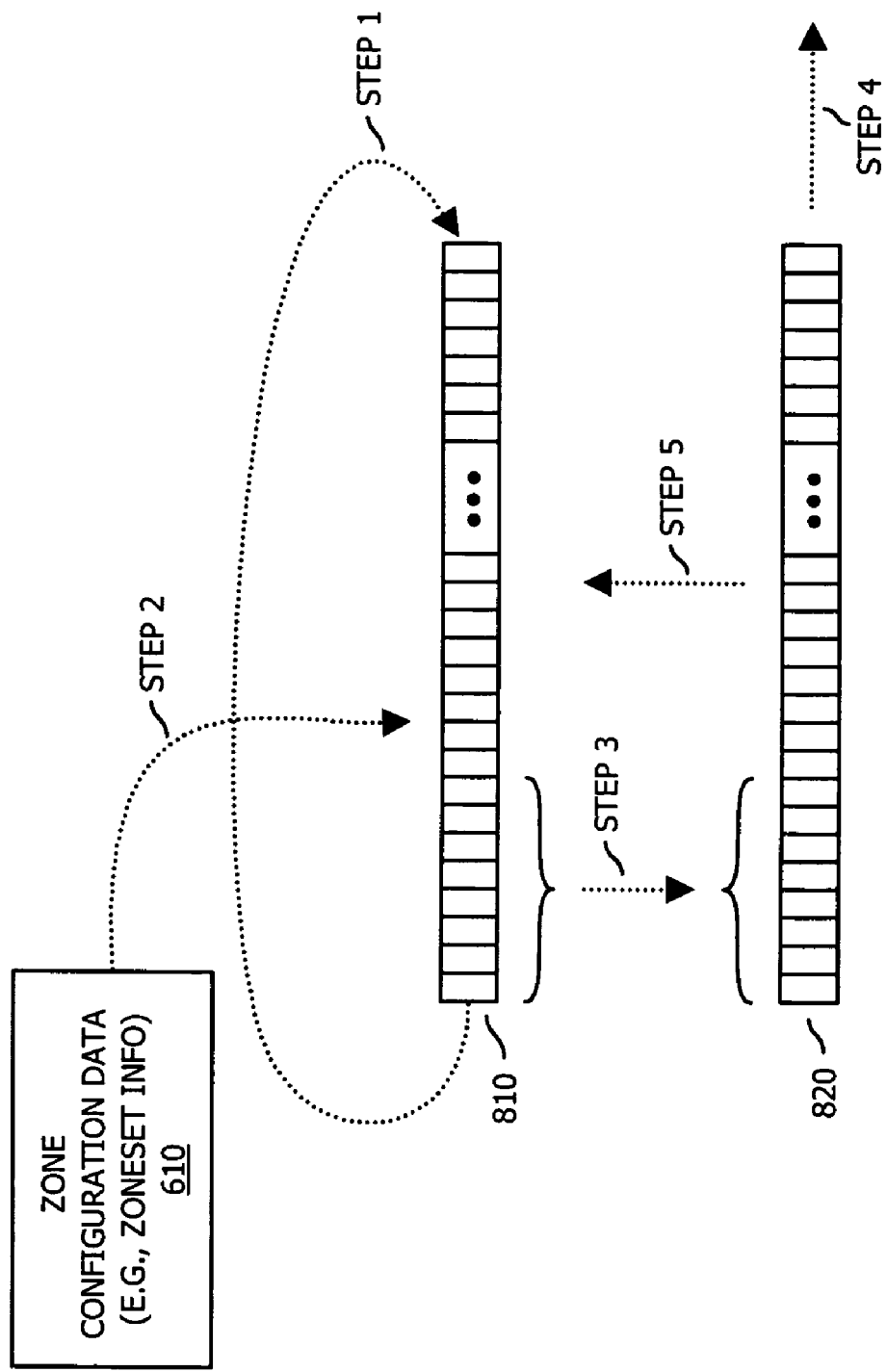
FIG. 8 is a diagram illustrating bit operations associated with a technique of generating a checksum value according to an embodiment herein.

FIG. 8 is a diagram illustrating a general function for generating a checksum value for each of the objects in the hierarchy of objects.

In step 1, the algorithm includes a left circular shift of a current checksum value in register 810 by a given number of bits, namely, num_shift_bits. Generation of the num_shift_bits value is discussed below and varies.

In step 2, the algorithm 620-1 includes adding a first byte as unsigned character to cur_checksum stored in register 810.

In step 3, the algorithm 620-1 includes constructing a new unsigned integer value called temp_checksum in register 820 such that the most left num_shift_bits bits of temp_checksum of register 820 are equal to the corresponding bits of cur_ckecksum and its other right most bits are all set to zero.

In step 4, if temp_checksum >0, then algorithm 620-1 right shifts temp_checksum in register 820 by (28-num_shift bits) bits.

In step 5, the algorithm 620-1 includes an operation of setting cur_checksum in register 810 equal to cur_checksum XORed with temp_checksum in register 810.

Repeat steps 1-5 for the next byte of the zone configuration data until all bytes are processed for an object. The final cur_checksum in register 810 is the checksum of the array of bytes associated with the object.

Algorithm 620-1 performs a similar set of operations for each object (e.g., zoneset, zone, member, alias) in the hierarchy. For example, the agent 385 applies the algorithm 620-1 to generate a respective checksum value for each of multiple objects at different levels of the hierarchy of objects. Agent 385 produces the final checksum value for a zoneset or a set of zone configuration data by adding each of the checksum values produced for all of the objects (e.g., zoneset/zone/alias name or member) in the hierarchy. Agent 385 can generate a final checksum value 630-1 for a respective zoneset rather quickly because all operations in the algorithm 620-1 are either bit operation or addition.

Algorithm 620-1 uses a modulo operation (e.g., %) to vary the value of num_shift_bits for different objects (e.g., ZoneNames/AliasNames/Members) in the above routine. Algorithm 620-1 also defines two constants, namely, CHECKSUM_MODULE_BASE=19 and CHECKSUM_SHIFT_BITS_OFFSET=2 for the modulo operation to calculate num_shift_bits for a name or a member object. One can choose other values for CHECKSUM_MODULE_BASE and CHECKSUM_SHIFT_BITS_OFFSET. But, according to one embodiment, the CHECKSUM_MODULE_BASE should be a prime number. The num_shift_bits for a zoneset name is chosen to be 4. The num_shift_bits for a zone name is determined based on the zoneset name checksum and zone itself. The num_shift_bits for alias name is determined by its zoneset name checksum, its zone name checksum and itself. The num_shift_bits for a member is dependent on its parents' names (e.g., parent zone names) checksums and itself. Thus, agent 385 applies algorithm 620-1 to calculate a shift value (e.g., num_shift_bits) based on a name associated with an object at a level of the hierarchy to generate a checksum value associated with the object.

The following example of steps A-D illustrates how to calculate num_shift_bits for a member of a zone in a zoneset and the checksum of the member.

Assume that we already have the zone name checksum denoted by zonename_checksum. Please note that zonename_checksum is also dependent on the checksum of its zoneset name.

Step A: num_shift_bits=(zonename_checksum % CHECKSUM_MODULE_BASE)+CHECKSUM_SHIFT_BITS_OFFSET.

Step B: use the function in FIG. 8 and num_shift_bits to compute a temporary checksum, denoted by c1, of a given member.

Step C: num_shift_bits_1=(c1 % CHECKSUM_MODULE_BASE)+CHECKSUM_SHIFT_BITS_OFFSET.

Step D: Append the zone name to the member to form a new array of bytes. Use the function in FIG. 8 (e.g., steps 1-5) to calculate the checksum of the new array that is used as the checksum of the member. For the given calculation, use num_shift_bits_1 for the member part and num_shift_bits for the zone name part. This is further discussed in more detail in the example below.

When algorithm 620-1 calculates the checksum of a member object, the algorithm first constructs a new array of bytes by appending a respective zone or alias name to the member object. For example, when algorithm 620-1 produces a checksum value for member M1 in FIG. 7, algorithm 620-1 appends the name associated with zone Z1 to the value such as a name associated with member M1 to generate the checksum value. Thereafter, the algorithm 620-1 performs the checksum of the array of bytes as the member's checksum as shown in Example 1. A member can be in two or more zones, or can be moved from one zone to another. Using this algorithm, a member in a zone will be assigned a checksum value that is different from the checksum assigned to the same member in another zone so that the checksums can catch such a difference between zones.

The same technique as discussed in Example 1 above can be used to calculate the checksum of a zone/alias name. For example, the algorithm involves appending a name of an associated parent object to the child object in which the checksum value is being generated. That is, when algorithm 620-1 calculates a checksum value for zone Z1, algorithm 620-1 appends the name associated with zoneset ZS1 to the name associated with zone Z1.

Algorithm 620-1 uses the same set of operations in FIG. 8 to produce the zoneset name checksum value. For this case, since zoneset is at the root of the hierarchy, the algorithm 620-1 utilizes a value of num_shift_bits=4 to produce the checksum value for zoneset.

As mentioned above, in one embodiment, note that the algorithm 620-1 generates a checksum value independent of the ordering of zones, aliases or their members, and that the checksum obtained by the algorithm is as well defined for a zoneset as an unordered set of zones/aliases and their members.

Assume that the operations in FIG. 8 are characterized by a function such as get_checksum (array of bytes, num_bytes, shift_bits, checksum), where array of bytes is retrieved from the zone configuration data, num_bytes identifies a number of bytes in the array, shift_bits identifies num_shift_bits used in the operation, and checksum is initially a value of zero or other non-zero value when carried forward. The following example illustrates how to generate checksum values for objects at different levels of the hierarchy in FIG. 7. Algorithm 620-1 generates checksum value c1 for zoneset ZS1, checksum value c2 for zone Z1, and c3 for member M1. Algorithm 620-1 generates checksum values in a similar way for each level.

For generating checksum value c1:
set num_shift_bits=4 because ZS1 has no parent
c1=get_checksum ("ZS1", 3, 4, 0)
For generating checksum value c2:
first append "ZS1" to "Z1"
set shift_bits__1=(c1% 19)+2
c2__1=get_checksum ("Z1", 2, shift_bits__1, 0)
set shift_bits__1__1=(c2__1% 19)+2
c2__2=get_checksum ("Z1", 2, shift_bits__1__1, 0)
c2=get_checksum ("ZS1", 3, shift_bits__1, c2__2)
For generating checksum value c3:
append "Z1" to "M1"
shift_bits__2=(c2% 19)+2
c3__1=get_checksum ("M1", 8, shift_bits__2, 0) (assume M1 is an 8-byte WWN)
shift_bits__3=(c3__1% 19)+2
c3__2=get_checksum ("M1", 8, shift_bits__3, 0) (assume M1 is an 8-byte WWN)
c3=get_checksum ("Z1", 2, shift_bits__2, c3__2)

Accordingly, algorithm 620-1 generates a first checksum value, c1, for an object at a first level of the hierarchy and generates a second checksum value, c2, and so on. Also, algorithm 620-1 generates a checksum value associated with a first object at one level of the hierarchy (e.g., as identified by zone configuration data) based at least in part on appending a character string associated with the first object to a character string associated with a second object at another level of the hierarchy. For example, algorithm 620-1 appends character string "Z1" to character string "M1" to calculate a checksum value for member M1.

Algorithm #2

This algorithm is based on conversion of zoning objects to one or more 4 byte words and includes rotating and reshuffling bits in every word.

Function zoneset_checksum (Level 1 of FIG. 7)

As discussed above, a zoneset has a name and can contain one or more zones. The zoneset checksum for ZS1 is calculated as sum of the zoneset name checksum (e.g., the name_checksum function utilizes an initial shift value of 0 bits for the root level of the hierarchy) and checksums for all zones included in the zoneset. Thus, in general, zoneset_checksum (for Level 1)=zoneset_name_checksum+ zone1_checksum+zone2_checksum+ . . . . The functions for generating zoneset_name_checksum (e.g., name_checksum) and zone_checksum are discussed below.

Function zone_checksum (Level 2 of FIG. 7)

Each zone has a name and can contain zoning aliases and pure zoning members. A zone checksum is calculated as sum of the zone name checksum (zone_name_checksum function utilizes an initial shift value of 1 bit for objects at Level 2 of the hierarchy) and checksums for all aliases included in the zone (zoning_alias_checksum function) and checksums for all zone members (zoning_member_checksum function). Thus, in general, zone_checksum (for Level 2)=zone_ name_checksum+alias1_checksum+alias2_checksum+ . . . + member1_checksum+member2_checksum+ . . . . The functions for generating zone_name_checksum (e.g., name_checksum), zone_member_checksum, and zone_alias_checksum are discussed below.

Function zoning_alias_checksum (Levels 3 of FIG. 7)

Each zoning alias includes a named group of zoning members. A zoning alias checksum is calculated as sum of the alias name checksum (name_checksum function with initial shift of 2 bits at level 3 of the hierarchy) and all alias members checksums (zoning_member_checksum function). Thus, in general, alias_checksum=alias_name_checksum+ member1_checksum+member2_checksum+ . . . . The functions for generating alias_name_checksum (e.g., name_checksum) and member_checksum are discussed below.

Function member_checksum (Level 4 of FIG. 7)

As discussed, there are several types of zone members. The checksum values associated with the members are calculated in different ways.

For WWN zoning members, the algorithm 620-2 applies the binary_checksum to the 64-bit WWN value to generate the checksum value for the member.

For port zoning members, each port zoning member is represented by 2 integer values: a switch domain ID and a port number. Both of the values are typically integers less than 256 (8 bits). In this case, algorithm 620-2 performs the following two operations:

1. The algorithm 620-2 constructs a word (32 bits) from the domain id (8 bits) and port number (8 bits) as follows:

| | |
|---|---|
| Word[0] = domain | (first byte) |
| Word[1] = port | (second byte) |
| Word[2] = domain+port | (third byte) |
| Word[3] = ~(domain+port) | (fourth byte) (where ~ is an inversion function in which every bit of logic 0 is replaced by a 1, and every logic 1 bit is replaced by a logic 0) |

2. Rotate the word using function rotate_word.

For each member, the algorithm 620-2 mixes the member with its respective container name. Members M1, M2, and M3 in FIG. 7 each have a respective container name of zone Z1, members M5 and M6 have a respective container of alias A1, and so on.

This additional operation for zone members addresses a possible exchange of members between two zones and returns different checksums when one member is moved from zone 1 to zone 2 and another member is moved from zone 2 to zone 1. To solve this potential problem and catch this change in configuration data, each zoning member checksum is XOR'ed with the respective container zone/alias name checksum such that member_checksum=member_checksum XOR zone_name_checksum or member_checksum=member_checksum XOR alias_name_checksum depending on whether the member belongs to a zone or an alias. Thus, according to one embodiment herein, the algorithm 620-2 generates a checksum value associated with an object in the hierarchy depending on a name of a class or container to which the object belongs.

Function name_checksum (string, initial_shift . . . )

For this function, the algorithm 620-2 takes every next 4 characters of the name string associated with the respective object as a word, rotates it (using function rotate_word with initial_shift) and accumulates (e.g., sums) the rotated words.

Function binary_checksum (binary, size_of_binary . . . )

The value "binary" in this function is an array of bytes of a given size. When executing this function of the algorithm 620-2, the agent 385 takes every next 4 bytes of the binary data as a word, rotates it (using function rotate_word) and accumulates (sums) the rotated words.

Function rotate_word (word, init_shift_bits)

Each word is a 32 bit value (regular integer). This function involves rotating the bits in the word by a shift (number of bits) that depends on the initial word value and the input initial shift bits. The function then reshuffles bits in the word in an order depending on the value of the rotated word as discussed below.

For example, the shift bits number is determined by sum of every 5 bits starting from the least significant bit added to the init_shift_bits:

Shift_bits=init_shift_bits+word bits[0 . . . 4]+word bits[5 . . . 9]+ . . . +word bits[25 . . . 29]+word bits[30 . . . 31]. Thus, an embodiment herein involves employing algorithm 620-2 to shift data bits associated with an object at a level of the hierarchy a different amount depending on the level of the object in the hierarchy as well as a value produced by adding 5 bit segments. The shift_bits value is 5 bits and therefore supports up to a 32-bit shift.

After shifting the bits, the agent 385 reshuffles the bits in the word. The rotated word value is used as a key for reshuffling (order of bits movement depends on the word value). The algorithm here is similar to reshuffling the stack of cards such as splitting the word into two halves and then merging them.

1. Divide word (32 bits) into 2 halves (16 bits each).

2. Construct a new word value by taking a next bit from the left half or right half of the word depending on the value of the original word. Accordingly, the original bits in a word dictate whether to take a next bit from the left half of the word or the right half of the word in the original word. The original word is shuffled depending on a value of the bits in the original word. Thus, one embodiment herein involves applying algorithm 620-2 to reshuffle an ordering of data bits associated with an object in the hierarchy depending on settings of the data bits.

For example: if the word was (in binary) 1001011010 . . .

Then the reshuffled word will be constructed as follows:

New_word[bit 0]=orig_word[bit 16] (since the first bit in the original word is 1, we take the first bit for the new word from the right half).

New_word[bit 1]=orig_word[0] (since the second bit in the original word is 0, we take the next bit for the new word from the left half).

New_word[bit 2]=orig_word[1] (since the third bit in the original word is 0, we take the next bit for the new word from the left half).

New_word[bit 3]=orig_word[17] (the forth bit in the original word is 1)

New_word[bit 4]=orig_word[2] (the fifth bit in the original word is 0)

New_word[bit 5]=orig_word[18]

New_word[bit 6]=orig_word[19]

New_word[bit 7]=orig_word[3]

New_word[bit 8]=orig_word[20]

New_word[bit 9]=orig_word[4] and so on.

3. Repeat steps 1 and 2 four times taking the word constructed in step 2 of the previous iteration as original word for the next iteration.

Figure 9:
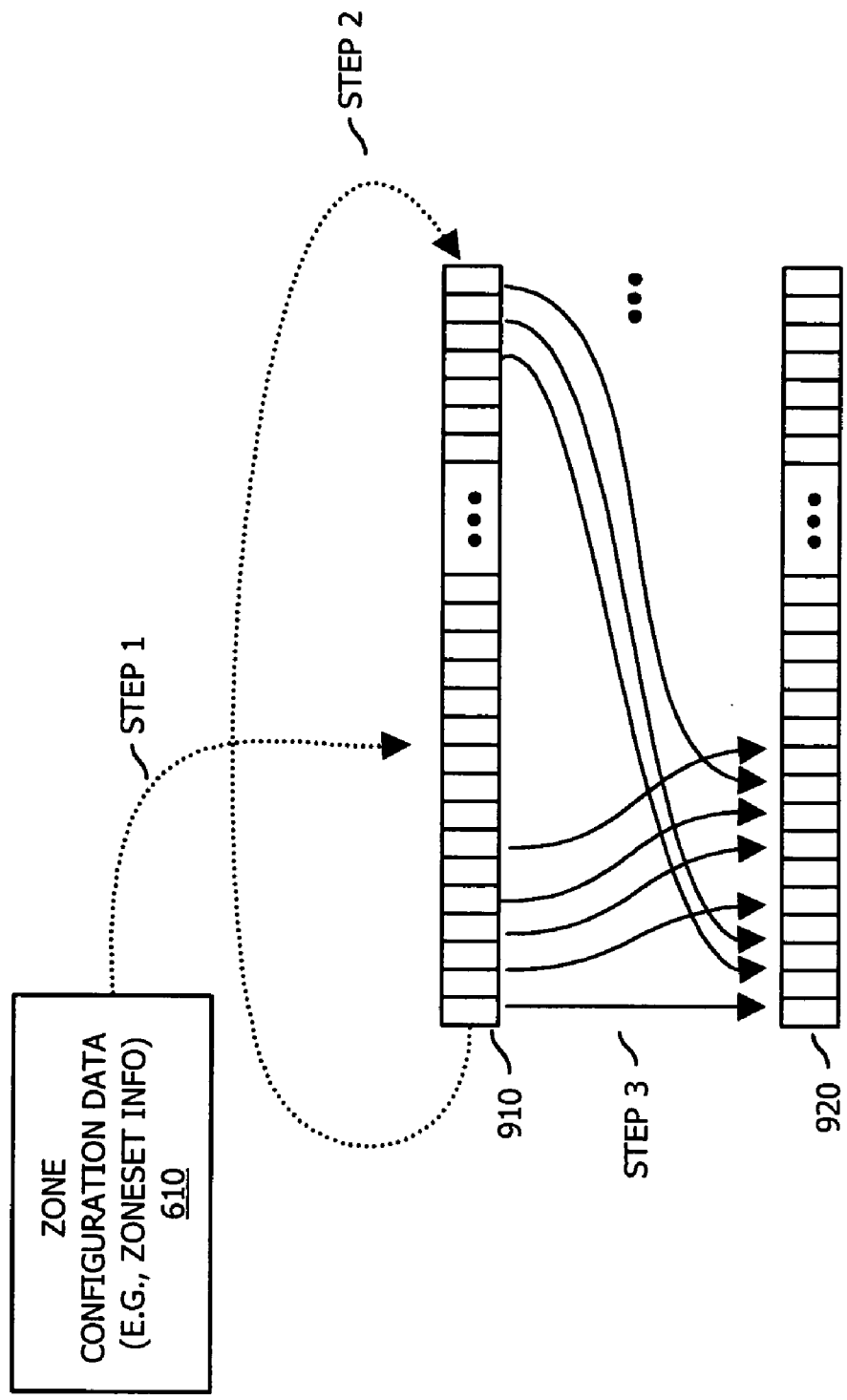
FIG. 9 is a diagram illustrating bit operations associated with a technique of generating a checksum value according to an embodiment herein.
Figure 10:
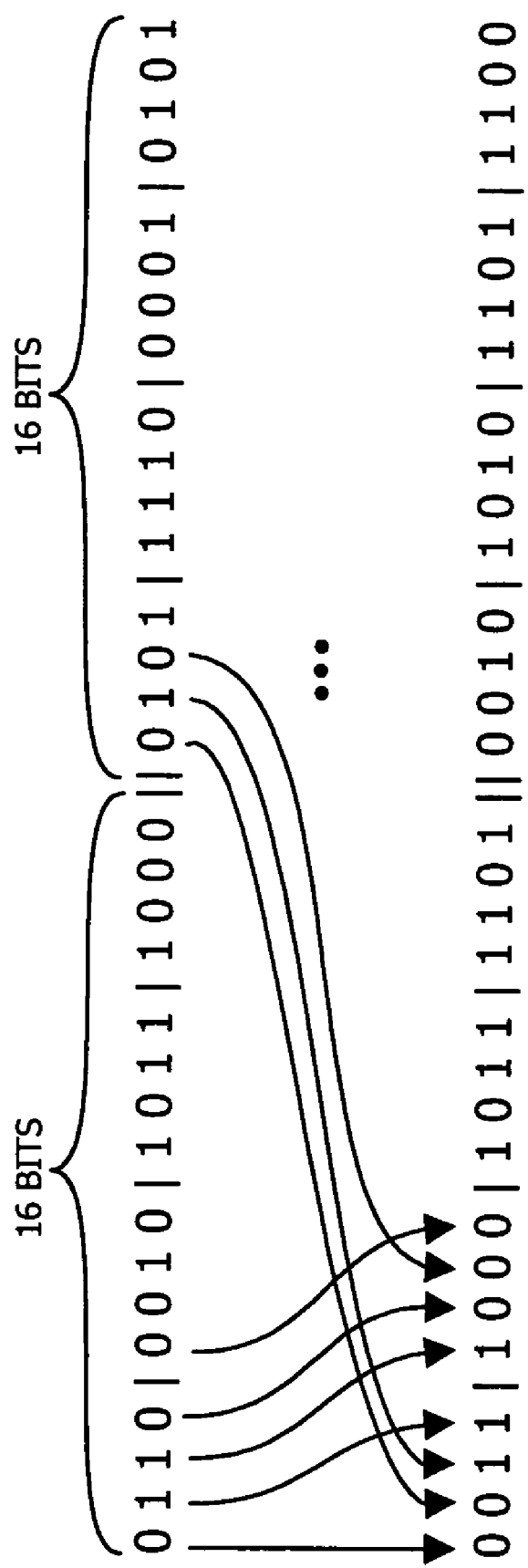
FIG. 10 is a diagram illustrating reshuffling of bits to generate a checksum value according to an embodiment herein.

FIG. 9 is a diagram illustrating rotation and reshuffling of bits as discussed above. In step 1, agent 385 stores appropriate portions of zone configuration data as discussed above in register 910. In step 920, agent 385 performs rotation of bits depending on a value of shift_bits for function rotate_word. In step 3, the agent 385 reshuffles the bits in register 910 to a new order in register 920. FIG. 10 is a diagram more particularly illustrating how bits are reshuffled according to an embodiment herein.

As discussed, techniques of the invention are well suited for use in applications in which there is a need to identify when there has been a change to zone configuration data in a storage area network. However, it should be noted that embodiments of the invention are not limited to use in such applications and thus embodiments of the invention are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method for generating a checksum value associated with configuration settings of a network, the computer-implemented method comprising:

receiving network configuration information associated with the network;

processing the network configuration information to identify a hierarchy of objects associated with the network; and applying at least one algorithm to different levels of the hierarchy of objects to generate a substantially unique checksum value associated with the network configuration information;

wherein applying the at least one algorithm includes performing operational steps of:

i) in a first direction, shifting a current checksum value in a first register by a number of bits;

ii) adding a data value to the current checksum value in the first register;

iii) producing a temporary checksum value in a second register based on a portion of bits of the current checksum value in the first register;

iv) in a second direction opposite the first direction, shifting bits of the temporary checksum value in the second register; and v) applying an operation to a combination of the current checksum value in the first register and the temporary checksum value in the second register and storing results of the operation as the current checksum value in the first register.

2. A computer-implemented method as in claim 1, wherein receiving the network configuration information includes receiving a hierarchy of zone configuration information associated with a storage area network; and wherein processing the network configuration information includes:

i) identifying a zoneset associated with the storage area network, ii) identifying multiple zones associated with the zoneset, and iii) identifying at least one respective zone member associated with each of the multiple zones.

3. A computer-implemented method as in claim 1, wherein applying the at least one algorithm includes generating a first checksum value for an object at a first level of the hierarchy and generating a second checksum value at a second level of the hierarchy, the computer-implemented method further comprising:

generating the substantially unique checksum value associated with the network configuration information based at least in part on the first checksum value and the second checksum value.

4. A computer-implemented method as in claim 1, wherein applying the at least one algorithm includes:

applying a first algorithm to the network configuration information to generate a first portion of the substantially unique checksum value;

applying a second algorithm to the network configuration information to generate a second portion of the substantially unique checksum value; and concatenating the first portion and the second portion to produce the substantially unique checksum value associated with the network configuration information.

5. A computer-implemented method as in claim 4, wherein applying the first algorithm to the network configuration information includes:

generating a checksum value associated with a first object at one level of the hierarchy based at least in part on appending a character string associated with the first object to a character string associated with a second object at another level of the hierarchy.

6. A computer-implemented method as in claim 4, wherein applying the second algorithm to the network configuration information includes:

generating a checksum value associated with a first object at one level of the hierarchy based at least in part on a relationship of the first object with respect to a second object at another level of the hierarchy.

7. A computer-implemented method as in claim 1, wherein applying the at least one algorithm to different levels of the hierarchy of objects to generate the substantially unique checksum value includes producing a same checksum value for the network configuration information regardless of an order of processing multiple objects at a level of the hierarchy.

8. A computer-implemented method as in claim 1, wherein applying the at least one algorithm to different levels of the hierarchy of objects to generate the substantially unique checksum value includes producing different checksum values for each of a first set of network configuration information and a second set of network configuration information, the first set of network configuration information being identical to the second set of network configuration information except that a member initially residing in a first zone of the first set of network configuration information is moved to a second zone in the second set of network configuration information.

9. A computer-implemented method as in claim 1, wherein applying the at least one algorithm results in generating a respective checksum value for each of multiple objects at different levels of the hierarchy of objects, the computer-implemented method further comprising:

utilizing respective checksum values associated with the multiple objects to generate the substantially unique checksum value associated with the network configuration information.

10. A computer-implemented method as in claim 1, wherein applying the at least one algorithm includes appending a name associated with an object at one level of the hierarchy to a name of an object at another level of the hierarchy to generate the substantially unique checksum value associated with the network configuration information.

11. A computer-implemented method as in claim 1, wherein applying the at least one algorithm includes performing an operational step of calculating a bit shift value based on a name associated with an object at a level of the hierarchy in which the object resides to generate a checksum value associated with the object, the computer-implemented method further comprising:

utilizing the checksum value associated with the object as well as other checksum values associated with other objects in the hierarchy to generate the substantially unique checksum value associated with the network configuration information.

12. A computer-implemented method as in claim 1, wherein applying the at least one algorithm includes shifting data bits associated with an object at a level of the hierarchy a different amount depending on the level of the object in the hierarchy.

13. A computer-implemented method as in claim 1, wherein applying the at least one algorithm includes generating a checksum value associated with an object in the hierarchy depending on a name of a class to which the object belongs.

14. A computer-implemented method as in claim 1, wherein applying the at least one algorithm includes reshuffling an ordering of data bits associated with an object in the hierarchy depending on settings of the data bits.

15. A computer system that generates a checksum value associated with configuration settings of a network, the computer system comprising:

a processor;

a memory unit that stores instructions associated with an application executed by the processor; and an interconnect coupling the processor and the memory unit, enabling the computer system to execute the application and perform operations of:

receiving network configuration information associated with the network;

processing the network configuration information to identify a hierarchy of objects associated with the network; and applying at least one algorithm to different levels of the hierarchy of objects to generate a substantially unique checksum value associated with the network configuration information;

wherein applying the at least one algorithm includes performing operational steps of:

i) in a first direction, shifting a current checksum value in a first register by a number of bits;
ii) adding a data value to the current checksum value in the first register;
iii) producing a temporary checksum value in a second register based on a portion of bits of the current checksum value in the first register;
iv) in a second direction opposite the first direction, shifting bits of the temporary checksum value in the second resister; and
v) applying an operation to a combination of the current checksum value in the first resister and the temporary checksum value in the second register and storing results of the operation as the current checksum value in the first register.

16. A computer system as in claim 15, wherein applying the at least one algorithm includes:
applying a first algorithm to the network configuration information to generate a first portion of the substantially unique checksum value, wherein applying the first algorithm to the network configuration information includes generating a checksum value associated with a first object at one level of the hierarchy based at least in part on appending a character string associated with the first object to a character string associated with a second object at another level of the hierarchy; and
applying a second algorithm to the network configuration information to generate a second portion of the substantially unique checksum value, wherein applying the second algorithm to the network configuration information includes generating a checksum value associated with a first object at one level of the hierarchy based at least in part on a relationship of the first object with respect to a second object at another level of the hierarchy.

17. A computer system as in claim 15, wherein applying the at least one algorithm to different levels of the hierarchy of objects to generate the substantially unique checksum value includes producing different checksum values for each of a first set of network configuration information and a second set of network configuration information, the first set of network configuration information being identical to the second set of network configuration information except that a member initially residing in a first zone of the first set of network configuration information is moved to a second zone in the second set of network configuration information.

18. A computer program product including a computer-readable medium having instructions stored thereon for processing data information, such that the instructions, when carried out by a processing device, enable the processing device to perform the steps of:
receiving network configuration information associated with a network;
processing the network configuration information to identify a hierarchy of objects associated with the network; and
applying at least one algorithm to parent objects and child objects at different levels of the hierarchy of objects to generate a substantially unique checksum value associated with the network configuration information;
wherein applying the at least one algorithm includes performing operational steps of:
i) in a first direction, shifting a current checksum value in a first register by a number of bits;
ii) adding a data value to the current checksum value in the first register;
iii) producing a temporary checksum value in a second register based on a portion of bits of the current checksum value in the first register;
iv) in a second direction opposite the first direction, shifting bits of the temporary checksum value in the second register; and
v) applying an operation to a combination of the current checksum value in the first register and the temporary checksum value in the second register and storing results of the operation as the current checksum value in the first register.

19. A computer-implemented method as in claim 1 further comprising:
maintaining a given zone member to belong to both a first zone and a second zone, the first zone and the second zone residing at a first level of the hierarchy, the given zone member residing at a second level of the hierarchy beneath the first level;
wherein applying the at least one algorithm comprises:
assigning a first checksum value for the given zone member residing in the first zone; and
assigning a second checksum value for the given zone member residing in the second zone, the first checksum value being different than the second checksum value.

20. A computer-implemented method as in claim 1 further comprising:
for a given zone member that initially belongs to a first zone in the hierarchy, assigning a given zone member a first checksum value; and
upon moving of the given zone member from the first zone to a second zone in the hierarchy, assigning the given zone member a second checksum value, the second checksum value being different than the first checksum value because the given zone member moved from the first zone to the second zone.

21. A computer-implemented method as in claim 20, wherein assigning the given zone member the first checksum value comprises generating the first checksum value based on a combination of: i) configuration data associated with the given zone member, and ii) configuration information associated with first zone, the first zone residing at a level in the hierarchy above a level of the given zone member in the hierarchy; and
wherein assigning the given zone member the second checksum value comprises generating the second checksum value based on a combination of: i) configuration data associated with the given zone member, and ii) configuration information associated with second zone, the second zone residing at a level in the hierarchy above a level of the given zone member in the hierarchy.

22. A computer-implemented method as in claim 1, wherein applying at least one algorithm to the different levels of the hierarchy includes:
generating the substantially unique checksum value for a given object in the hierarchy based on i) the given object in the hierarchy, and ii) an additional object in the hierarchy, the additional object residing at a level above the given object in the hierarchy.

* * * * *